United States Patent
Park et al.

(10) Patent No.: US 9,843,722 B2
(45) Date of Patent: Dec. 12, 2017

(54) IMAGE GENERATING DEVICE, 3D IMAGE DISPLAY SYSTEM HAVING THE SAME AND CONTROL METHODS THEREOF

(71) Applicant: SAMSUNG ELECTRONICS CO., LTD., Suwon-si (KR)

(72) Inventors: Sang-bae Park, Suwon-si (KR); Min-Hyok Bang, Anyang-si (KR); Keum-ok Lee, Suwon-si (KR); Dong-jin Lee, Suwon-si (KR); Jung-kun Lee, Seoul (KR); Jae-hoon Jeong, Suwon-si (KR); Kyung-sun Cho, Seoul (KR); Seong-seol Hong, Yongin-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 345 days.

(21) Appl. No.: 14/668,205

(22) Filed: Mar. 25, 2015

(65) Prior Publication Data
US 2015/0281678 A1  Oct. 1, 2015

(30) Foreign Application Priority Data
Mar. 25, 2014 (KR) ........................ 10-2014-0034828

(51) Int. Cl.
| | | |
|---|---|---|
| H04N 15/00 | (2006.01) | |
| H04N 13/00 | (2006.01) | |
| H04N 5/232 | (2006.01) | |
| H04N 5/225 | (2006.01) | |
| H04N 13/02 | (2006.01) | |

(52) U.S. Cl.
CPC ....... *H04N 5/23238* (2013.01); *H04N 5/2259* (2013.01); *H04N 13/0242* (2013.01); *H04N 13/0253* (2013.01); *H04N 13/0271* (2013.01)

(58) Field of Classification Search
CPC .................... H04N 5/23238; H04N 5/2259
USPC ........................................................... 348/43
See application file for complete search history.

(56) References Cited

U.S. PATENT DOCUMENTS 6,278,480 B1 * 8/2001 Kurahashi .......... G02B 27/2214
348/59
2009/0129667 A1 * 5/2009 Ho ........................ G06T 15/205
382/154

(Continued)

FOREIGN PATENT DOCUMENTS

JP      5181214 A    7/1993
KR  1020050106913 A  11/2005

*Primary Examiner* — Gims Philippe
*Assistant Examiner* — Amir Shahnami
(74) *Attorney, Agent, or Firm* — Sughrue Mion, PLLC

(57) ABSTRACT

The image generating device includes: a first camera configured to photograph a depth image of a subject using a first light; a second camera configured to photograph a color image of the subject by converting a second light into an image signal; a view angle extender configured to change a view angle, wherein the view angle is an angle at which the first camera and the second camera are operable to photograph the subject; and a controller configured to control the view angle extender to change the view angle of the first camera and the second camera and to form a single depth image and a single color image by respectively synthesizing a plurality of depth images and a plurality of color images, photographed by the first camera and the second camera.

31 Claims, 18 Drawing Sheets

(56) References Cited

U.S. PATENT DOCUMENTS

| | | | |
|---|---|---|---|
| 2009/0201384 A1* | 8/2009 | Kang | H04N 5/247 348/222.1 |
| 2009/0213240 A1* | 8/2009 | Sim | G06T 17/00 348/222.1 |
| 2012/0307357 A1* | 12/2012 | Choi | G02B 26/005 359/462 |
| 2013/0266182 A1 | 10/2013 | Shotton et al. | |
| 2015/0130799 A1* | 5/2015 | Holzer | G06F 3/04842 345/420 |
| 2015/0146926 A1* | 5/2015 | Ramachandran | G06K 9/00624 382/103 |

* cited by examiner

IMAGE GENERATING DEVICE, 3D IMAGE DISPLAY SYSTEM HAVING THE SAME AND CONTROL METHODS THEREOF

CROSS-REFERENCE TO RELATED APPLICATION

This application claims priority from Korean Patent Application No. 10-2014-0034828, filed on Mar. 25, 2014 in the Korean Intellectual Property Office, the entire disclosure of which is incorporated herein by reference.

BACKGROUND

Field

Apparatuses, systems, and methods consistent with the exemplary embodiments relate to an image generating device for photographing a three-dimensional (3D) image, and more particularly, to an image generating device capable of photographing a 3D panorama image or similar 3D images of various view angles and/or various resolutions, a 3D image display system having the same and control methods thereof.

Description of the Related Art

In general, a 3D image generating device, for example, a depth camera device refers to a camera device capable of photographing a 3D image, which is applicable to various fields including fields involving body recognition, face recognition, etc.

Such a depth camera device typically includes a depth camera for photographing a depth image, and a color camera for photographing a general color image.

The depth camera is generally classified into two types: a top of flight (TOF) type and an infrared (IR) pattern type.

As shown in FIG. 1, with the TOF type of depth camera, a distance from a subject is calculated through a TOF sensor so as to photograph a depth image 10. The TOF sensor includes a plurality of cells in each of which a light emitter and a light receiver are arranged, and measures the time taken in reflecting and returning infrared (IR) rays from the subject after transmitting the IR rays to the subject, thereby calculating the distance from the subject. The TOF type of depth camera has a simple structure and fast image-processing speed since it employs an algorithm of measuring only the distance, but is affected by interference with external environments such as light because the depth is determined based only on the distance from the subject.

As shown in FIG. 2, the IR pattern type of depth camera involves infrared (IR) rays being emitted to the subject in a specific pattern and a shape of an object corresponding to the emitted IR pattern is recognized to thereby photograph the depth image 10'. The IR pattern type depth camera is less affected by interference from the external environments than the TOF type of depth camera because it recognizes the shape of the subject itself. Therefore, the IR pattern type may be more preferred than the TOF type.

However, both the IR pattern type of depth camera and the TOF type of depth camera employ a lens having a fixed view angle, e.g., a view angle of 38°, and it is therefore impossible to photograph a depth image beyond the fixed view angle of 38°.

As a result, a conventional depth camera device with the foregoing IR pattern type of camera or the TOF type of camera cannot produce a 3D panorama image or a 3D image of various resolutions.

Further, if the depth camera device is used in motion control and/or a 3D image game such as a body recognition game, users of the game have to stand close to each other because the view angle of the 3D image recognized by the depth camera device is narrow. Therefore, users may bump against each other while they are playing the game, and much of the pleasure of the game will be lost.

SUMMARY

One or more exemplary embodiments may provide an image generating device capable of photographing a 3D panorama image or similar 3D images of various view angles and/or various resolutions, a 3D image display system having the same, and control methods thereof.

In accordance with an exemplary embodiment, there is provided an image generating device including: a first camera configured to photograph a depth image of a subject using a first light; a second camera configured to photograph a color image of the subject by converting a second light into an image signal; a view angle extender configured to change a view angle, wherein the view angle is an angle at which the first camera and the second camera are operable to photograph the subject; and a controller configured to control the view angle extender to change the view angle of the first camera and the second camera upon a condition that the subject is photographed by the first camera and the second camera and to form a single depth image and a single color image by respectively synthesizing a plurality of depth images and a plurality of color images, photographed by the first camera and the second camera.

The depth camera includes: a pattern generator configured to generate the first light in a pattern; and an image sensor configured to convert the first light having the pattern reflected from the subject into a depth image signal. At this time, the depth image signal may include information related to distance from the subject. The pattern may have a linear structure or a circular structure.

The view angle extender may include: a direction changer configured to be placed in an optical path of the first camera, the second camera and the subject, wherein the direction changer includes a reflection plane having an incline for changing a direction of the first light and the second light; and a rotary section configured to rotate the direction changer. At this time, the reflection plane may transmit the first light generated by the first camera to the subject and change the direction of the first light so that the first light reflected from the subject can be transmitted to the first camera, and change the direction of the second light input from the outside toward the second camera.

The direction changer may include a prism lens having the reflection plane.

The rotary section may include a motor including a driving shaft connected to the direction changer; and an encoder provided in the driving shaft of the motor, wherein the encoder senses rotation of the driving shaft.

The view angle may be set up by a user to be changed within a range from 0° to 270°, or, for example, from 142° to 270°.

The controller may compensate for distortion of the distance from the subject by calculating a difference in the distance from the subject with respect to a reference ray of the first light at each point of the rays of the first light of the pattern reflected from the subject and subtracting a pixel value related to the calculated distance difference from a pixel value related to each ray of the first light. The controller may compensate for deviation in a pixel position between the depth image and the color image caused by position difference between the first camera and the second camera based at least one the position difference between the first camera and the second camera. At this time, the deviation may be compensated for by matching a same characteristic point, or calculating a translation matrix using output image position matrixes related to the plurality of depth images and the plurality of color images and then cropping image data related to the plurality of depth images or the plurality of color images based on the calculated translation matrix.

The controller may adjust the plurality of depth images and the plurality of color images, or the single depth image and the single color image to have the same resolution. At this time, the resolution is adjusted with respect to the depth images or the single depth image.

In accordance with another exemplary embodiment, there is provided a method of controlling an image generating device, the method including: photographing a depth image of a subject using a first light; photographing a color image of a subject by converting a second light into an image signal; changing a view angle, wherein the view angle is an angle at which the depth image and the color image are photographed; and respectively synthesizing a plurality of depth images and a plurality of color images to form a single depth image and a single color image.

The changing the view angle may include transmitting the first light to the subject in a pattern, and rotating a reflection plane having an incline into an angle for changing a direction of the first light so that the first light reflected from the subject travels toward a first camera and for changing a direction of the second light toward a second camera.

The changing the view angle may include compensating for distortion of the distance from the subject by calculating the difference in the distance from the subject with respect to a reference ray of the first light at each point of the rays of the first light of the pattern reflected from the subject and subtracting a pixel value related to the calculated distance difference from a pixel value related to each ray of the first light. The changing the view angle may further include compensating for deviation in a pixel position between the depth images and the color images caused by position difference between the first camera and the second camera in consideration of the position difference between the first camera and the second camera. At this time, the deviation may be compensated for by matching the depth images and the color images with respect to a same characteristic point, or cropping image data related to the depth or color images based on a translation matrix after calculating the translation matrix via the output image position matrix with respect to the depth images and color images.

The changing the view angle position may include adjusting the plurality of depth images and the plurality of color images, or the single depth image and the single color image to have the same resolution. At this time, the resolution may be adjusted with reference to the depth images or the single depth image.

In accordance with still another exemplary embodiment, there is provided a display system including: the foregoing image generating device including a first camera for photographing a depth image and a second camera for photographing a color image; a second controller including a synthesizer configured to synthesize a single depth image and a single color image generated by the image generating device and form a 3D image; and a display configured to display the 3D image formed by the synthesizer.

The second controller may further include a program engine configured to generate and output at least one from among graphic data and text data required for executing an application based on at least one from among the single depth image and the single color image generated by the image generating device.

The program engine may include: a program generating block configured to recognize a user's motion based on at least one from among the single depth image and the single color image generated by the image generating device and generate at least one from among the graphic data and the text data required for executing the application in accordance with the recognized motion; and an image processing block configured to perform image processing with regard to at least one from among the generated graphic data and text data and output the processed data to the synthesizer.

The display system may include a 3D television (TV) system, a 3D personal computer (PC) system or augmented reality glasses.

In accordance with still another exemplary embodiment, there is provided a method of controlling a display system with an image generating device including a first camera for photographing a depth image and a second camera for photographing a color image, the method including: setting a view angle at which the first camera and the second camera are operable to photograph; photographing a plurality of depth images and a plurality of color images; synthesizing the photographed depth images and color images to form a single depth image and a single color image, respectively; synthesizing the single depth image and the single color image to form a 3D image; and displaying the formed 3D image.

The method may further include determining whether an operation mode is a photographing mode or an application executing mode.

Upon a condition that it is determined that the operation mode is the photographing mode, the forming the 3D image may include synthesizing only the single depth image and single color image to form the 3D image.

Upon a condition that it is determined that the operation mode is the application executing mode, the forming the 3D image may include: generating at least one from among graphic data and text data required for executing an application based on at least one from among the single depth image and single color image; performing image processing to at least one from among the generated graphic data and text data; and synthesizing at least one from among the processed graphed data and the processed text data with the single depth image and single color image to form a 3D application image.

In the above-described embodiments, the plurality of depth images and plurality of color images may be photographed while the view angle is changed by a view angle extender. Also, the distortion of the distance from the subject may occur based on an incline of the reflection plane.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION OF EXEMPLARY EMBODIMENTS

Below, an image generating device, a 3D image display system having the same and control methods thereof according to exemplary embodiments will be described with reference to accompanying drawings.

Figure 1:
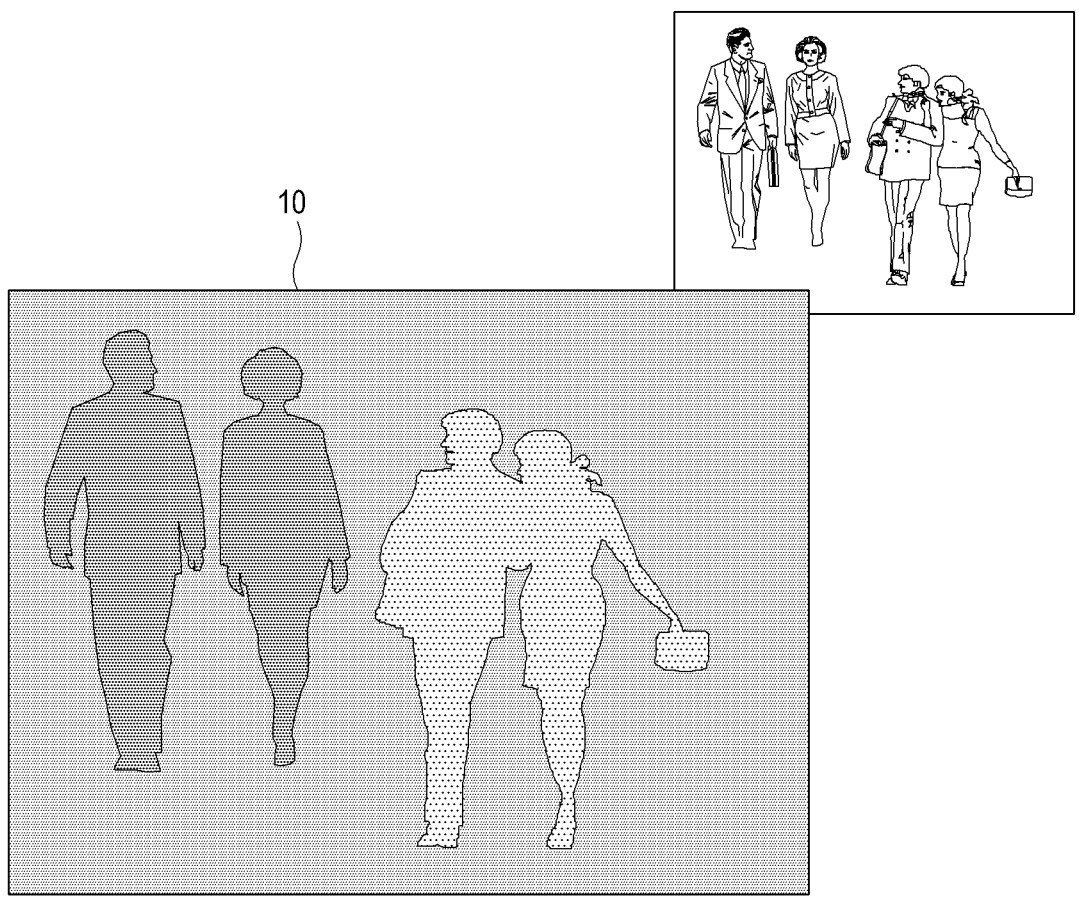
FIG. 1 is a view showing an example of a depth image photographed using a TOF type of depth camera.
Figure 2:
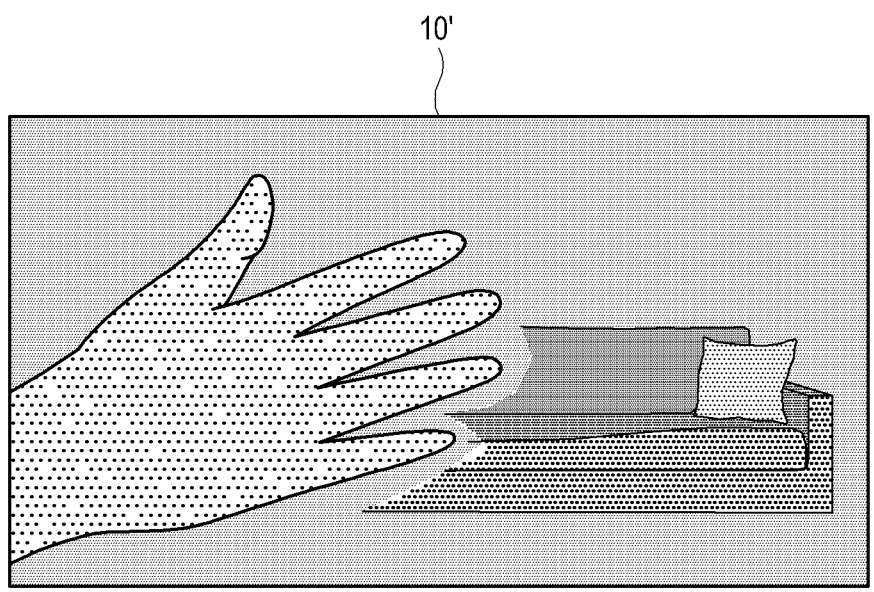
FIG. 2 is a view showing an example of a depth image photographed using an IR pattern type of depth camera.
Figure 3:
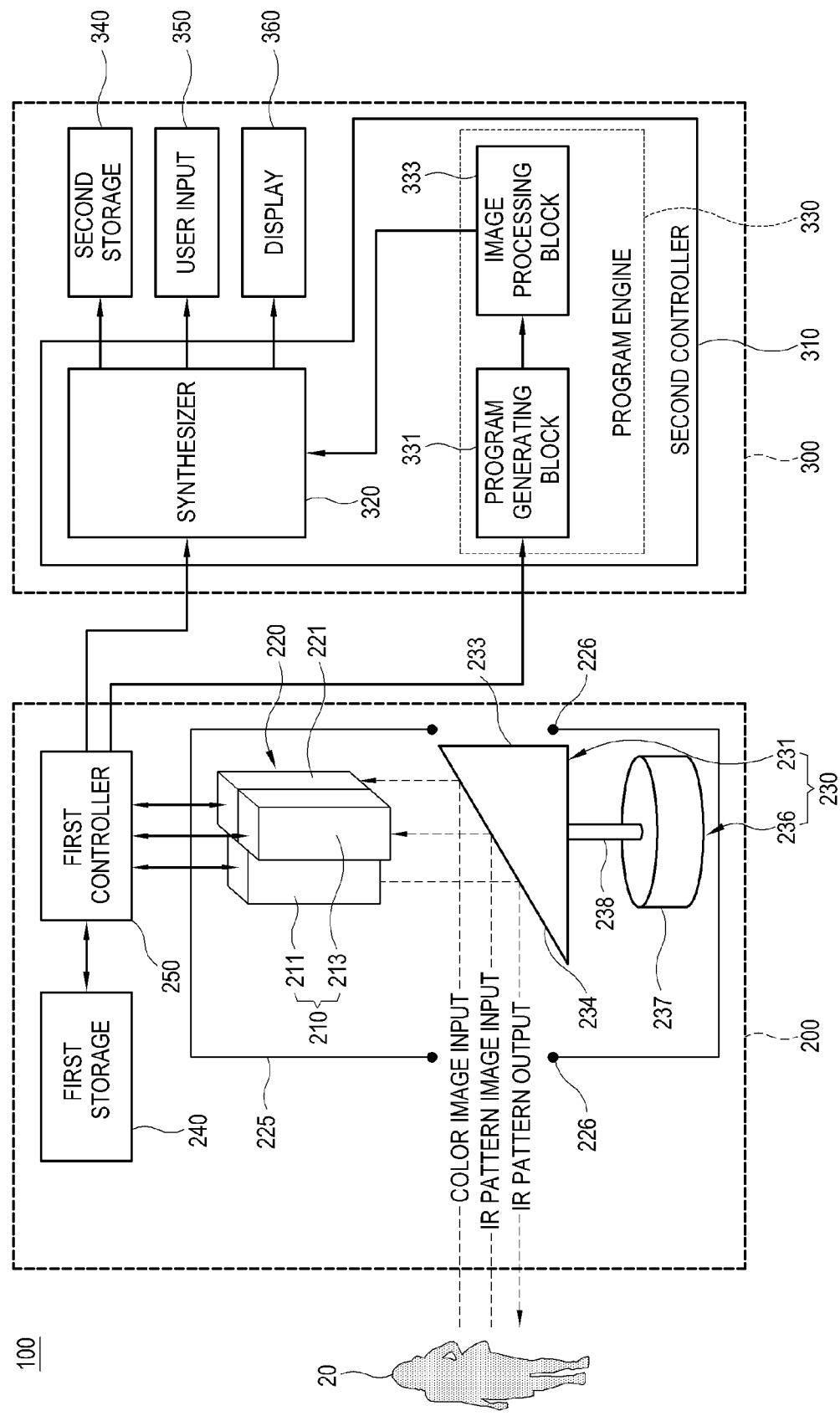
FIG. 3 is a block diagram of a 3D image display system with an image generating device according to an exemplary embodiment.

FIG. 3 is a block diagram of a display system with an image generating device according to an exemplary embodiment;

In this exemplary embodiment, a 3D image display system 100, which may be achieved by a 3D television (TV) system, a 3D personal computer (PC) system, or augmented reality glasses, etc., synthesizes and processes a depth image and a color image photographed by an image generating device 200 (the depth image and the color image having an extended view angle), for example, a panorama depth image (PDI) (see FIG. 8) and a panorama color image (PCI) (see FIG. 8), thereby displaying a 3D image based on the synthesized and processed images.

For convenience of description, a 3D TV system will be described below as the 3D image display system 100.

As shown in FIG. 3, the 3D image display system 100 includes an image generating device 200 and a display device 300.

Figure 4:
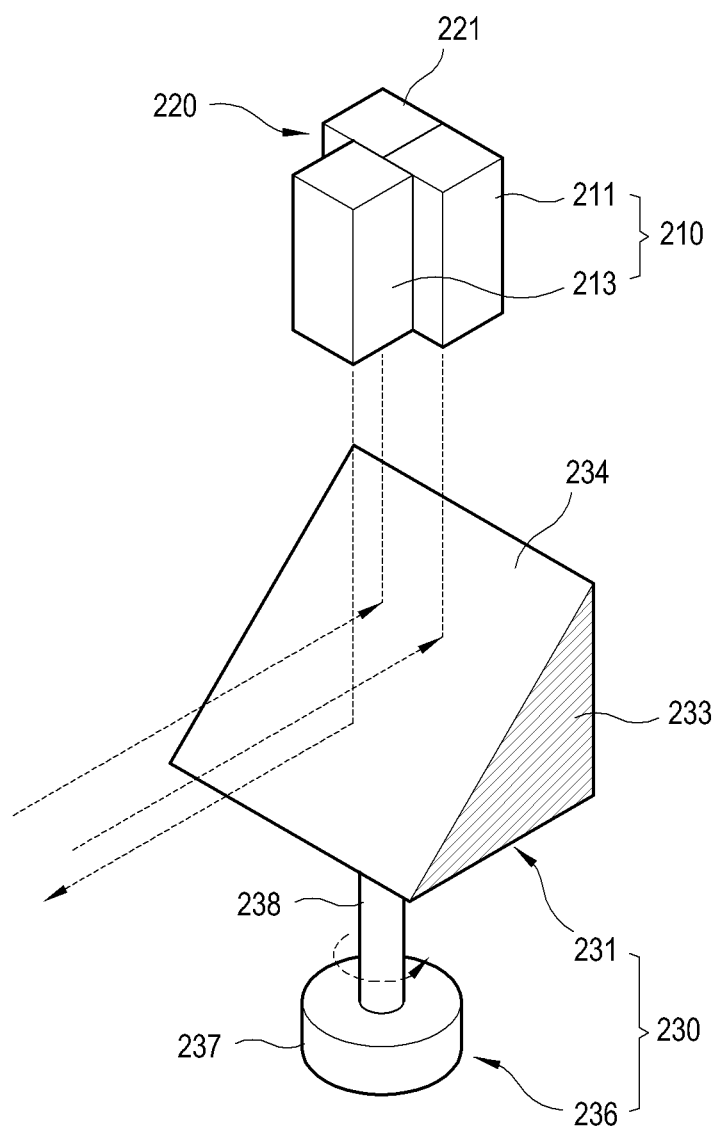
FIG. 4 is a perspective view showing an image generating device of the 3D image display system shown in FIG. 3.

As shown in FIG. 4, the image generating device 200 may be implemented as a depth camera device to photograph the depth image and the color image, of which view angles are extended, that is, the panorama depth image (PDI) and the panorama color image (PCI). The image generating device includes a depth camera 210, a color camera 220, a view angle extender 230, a first storage 240, and a first controller 250.

The depth camera 210 uses, for example, IR rays and photographs a depth image of a subject 20 under control of the first controller 250. To this end, the depth camera 210 includes an IR pattern generator 211 and a first image sensor 213.

The IR pattern generator 211 generates an IR ray and emits it to a prism lens 233 of a direction changer 231 (to be described later) so as to form a specific IR pattern.

In this exemplary embodiment, the specific IR pattern may be generated in units of pixel.

Also, the specific IR pattern may be generated to have a linear structure such as an array or a circular structure.

The first image sensor 213 converts the IR rays having a specific pattern, which are emitted to the subject 20 via an incident opening 226 via the prism lens 233 by the IR pattern generator 211 and reflected from the subject 20, into a depth image signal. The incident opening 226 is formed to have an arc shape having an angle of about 270 degrees and horizontally arranged in a main body housing 225 of the image generating device 200 so as to make it possible to change view angle positions P and P' for extending a view angle range to be photographed by the depth camera 210 and the color camera 220; such will be described later with reference to FIG. 6.

Figure 5:
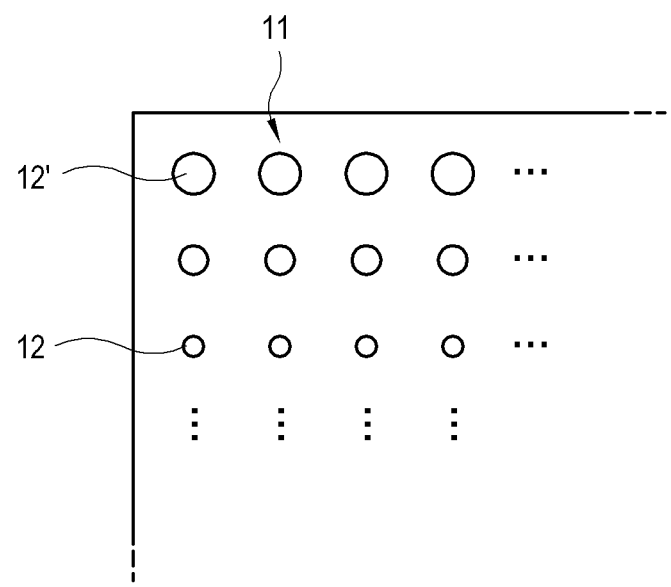
FIG. 5 is a view showing an example of an IR pattern of a depth image signal converted by a depth camera of an image generating device shown in FIG. 3.

At this time, the depth image signal converted from the IR rays includes information related to distance from the subject 20 with respect to each IR point of the IR pattern so that it can be represented by dots different in size, that is, different pixel values, in accordance with distances between each IR point of the IR pattern and the subject 20. In other words, as shown in FIG. 5, each IR point of the IR pattern 11 is represented by a relatively small pixel value 12 if it is distant from the subject 20, but is represented by a relatively large pixel value 12' if it is close to the subject 20.

Also, in this exemplary embodiment, the IR pattern 11 is formed in units of pixel by way of example. However, if the IR pattern is formed so that a distance between the IR points can be greater than a space between the pixels, the first controller 250 calculates average distance values between the subject and the corresponding IR points, and thus a pixel positioned between the IR points may be determined to have the size of a displayed pixel value in accordance with a calculated average distance value.

The first image sensor 213 may be achieved by a charged coupled device (CCD) or a complementary metal-oxide semiconductor (CMOS).

The color camera 220 converts light received from the outside through the incident opening 226 into an image signal under control of the first controller 250, thereby photographing a color image. The color camera 220 includes a second image sensor 221 for converting light into an image signal.

Like the first image sensor 213, the second image sensor 221 may be achieved by a CCD or CMOS.

The view angle extender 230 changes the view angle positions P and P' (see FIG. 6) of the depth camera 210 and the color camera 220 so that a view angle range to be photographed by the depth camera 210 and the color camera 220 can be extended.

Figure 6:
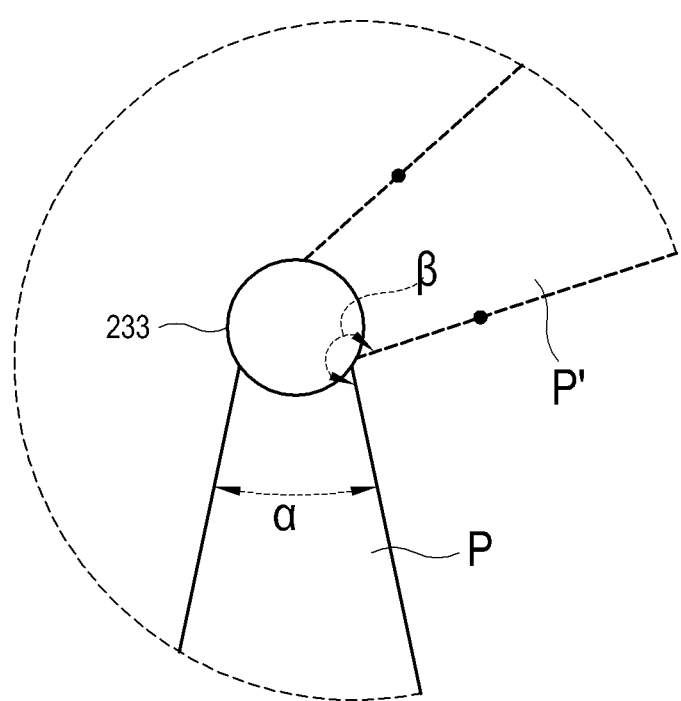
FIG. 6 is a view showing an example that a view angle extender of the image generating device shown in FIG. 3 changes view angle positions of the depth camera and a color camera.

Here, the view angle positions P and P', as shown in FIG. 6, refer to a position where a view angle α, e.g., 38° that can be photographed by the depth camera 210 and the color camera 220, is positioned.

The view angle positions P and P' may be changed to have a specific angle β, for example, an angle range from 0° to 270° in consideration of the incident opening 226, (for example, an angle range from 142° to 270°) capable of photographing the panorama color image (PCI) and the panorama depth image (PDI) of 180° or greater, so as to acquire a single depth image and a single color image photographed in a view angle more extended than the view angle α that can be photographed by the depth camera 210 and the color camera 220.

The specific angle β may be set up through a rotation angle selection tap (not shown) displayed along with a mode selection tap (not shown) for selecting a photographing mode or an application executing mode when a 3D image photographing setup screen (not shown) is selected on an initial screen of a photographing control program executed by a second controller 310 in accordance with a user's selection through a user input 350 of the display device 300 (to be described later).

The view angle extender 230 includes a direction changer 231, and a rotary section 236.

The direction changer 231 is placed on an optical path of the depth camera 210, the color camera 220 and the subject 20 and includes a reflection plane 234 for changing a traveling direction of the IR ray and light. The reflection plane 234 transmits the IR rays generated by the IR pattern generator 211 of the depth camera 210, changes the traveling direction of the IR rays so that the IR rays reflected from the subject 20 can be transmitted to the first image sensor 213 of the depth camera 210, and changes the traveling direction of the light so that the light received from the outside can travel toward the second image sensor 221 of the color camera 220. To this end, the reflection plane 234 has an incline so that the traveling direction of the IR rays and the light can be changed by, for example, about 90°.

The reflection plane 234 may be formed in a form of a flat surface. Alternatively, the reflection plane 234 may be in a form of curved surface with a certain curvature, such as a convex surface.

The direction changer 231 may be achieved by the prism lens 233 having the reflection plane 234.

The rotary section 236 is to rotate the prism lens 233 of the direction changer 231 so that the view angle positions P and P' of the depth camera 210 and the color camera 22 can be changed to have the specific angle β under control of the first controller 250. The rotary section 236 includes a motor 237 and an encoder 239 (see FIG. 7).

The motor 237 has a driving shaft 238 connected to a lower side of the prism lens 233 so as to rotate the prism lens 233 pursuant to control of the direction changer 231.

Figure 7:
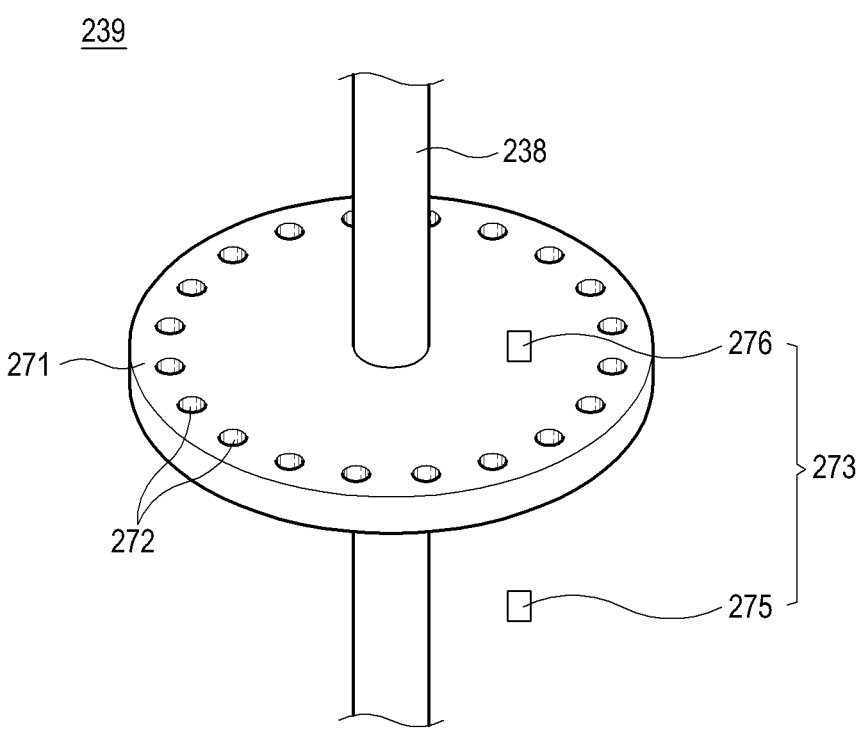
FIG. 7 is a partial perspective view showing an encoder of a rotary section of the image generating device shown in FIG. 3.

As shown in FIG. 7, the encoder 239 is built in or on the motor 237 so as to be installed in the driving shaft 238 of the motor 237, and senses rotation of the driving shaft 238.

The encoder 239 includes a disc 271, and a photosensor 273. The disc 271 is installed in the driving shaft 238 and formed with a plurality of holes 272 along its edge. The photosensor 273 is installed opposite to the hole 272, and includes a light emitter 275 and a light receiver 276.

Thus, when the disc 271 is rotated by the driving shaft 238 of the motor 237, the photosensor 273 generates an 'on' signal when the light emitter 275 and the light receiver 276 are aligned with the hole 272, and generates an 'off' signal when the light emitter 275 and the light receiver 276 are not aligned with the hole 272. The first controller 250 counts the number of 'on' signals generated by the photosensor 273 and calculates a rotation angle of the driving shaft 238 and estimates a rotation angle of the prism lens 233 in accordance with the counted numbers. The first controller 250 controls the motor 237 to be driven in accordance with the estimated rotation angle of the prism lens 233, and adjusts the rotation angle of the prism lens 233 by a specific angle β set up by a user.

The first storage 240 stores a control program for controlling general operations of the image generating device 200 such as driving of the motor 237, the IP pattern generator 211, etc. and controlling operations for forming the panorama color image (PCI) and the panorama depth image (PDI) (to be described later).

Also, the first storage 240 stores the panorama color image (PCI) and the panorama depth image (PDI) whenever the panorama color image (PCI) and the panorama depth image (PDI) are formed (to be described later) while the view angle positions P and P' of the depth camera 210 and the color camera 220 are rotated according to a specific angle β.

The first storage 240 may be achieved by a flash memory, a hard disk drive, or the like nonvolatile memory.

The first controller 250 controls general operations of the image generating device 200.

Figure 16:
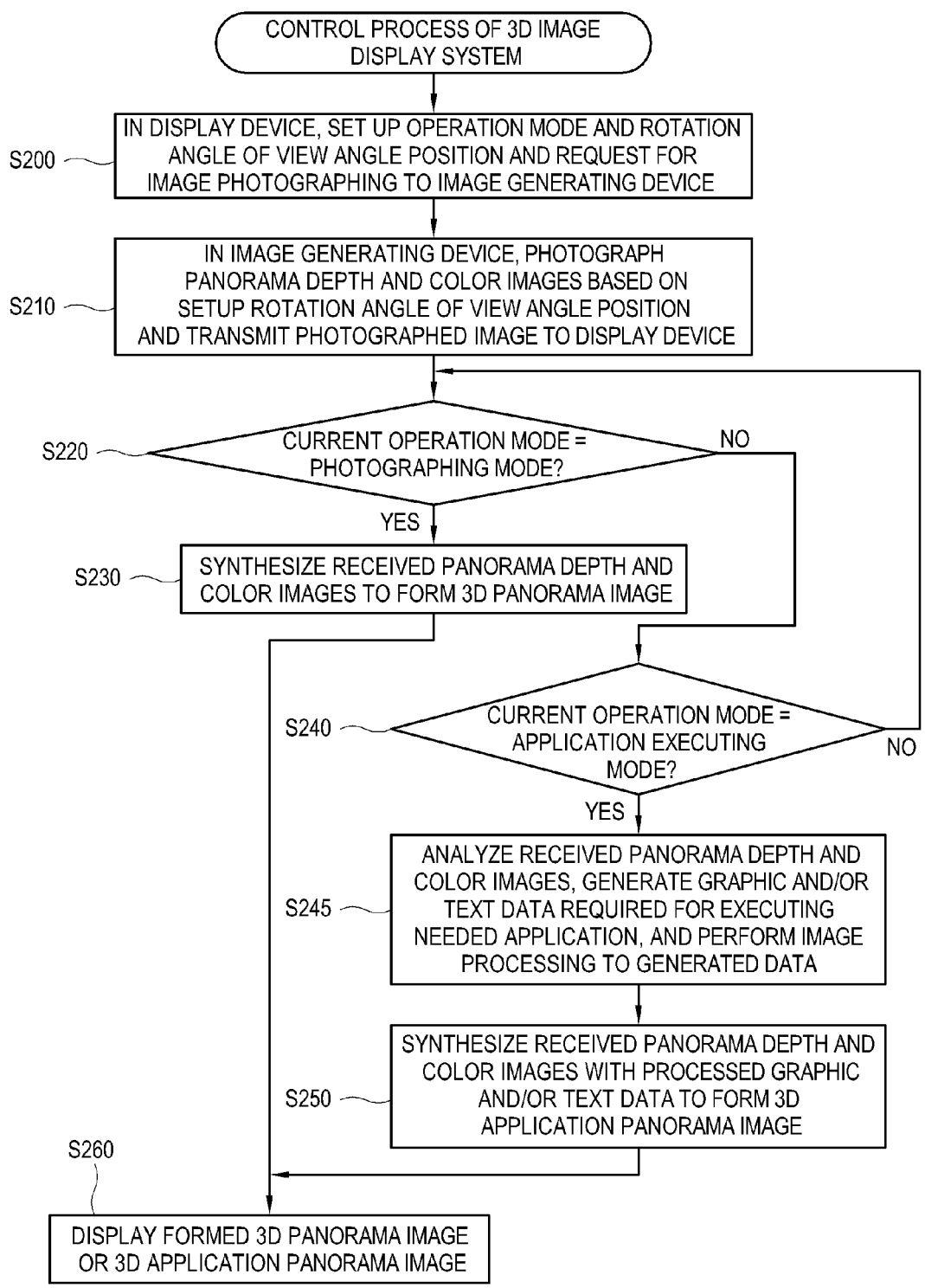
FIG. 16 is a flowchart showing an example of a control process for the 3D image display system according to another exemplary embodiment.

Also, the first controller 250 forms the single depth image and the single color image, the view angles of which are extended through the depth camera 210 and the color camera 220, that is, the panorama depth image (PDI, see FIG. 8) and the panorama color image (PCI, see FIG. 8), while controlling the rotary section 236 in accordance with a rotation angle of the view angle positions P and P' if the rotation angle of the view angle positions P and P' set up by a user together with an image photographing request from the second controller 310 of the display device 300 are received (to be described later with reference to FIG. 16).

That is, the first controller 250 respectively synthesizes the depth image frames and the color image frames respectively photographed by the depth camera 210 and the color camera 220 and converts them into the panorama depth image (PDI) and the panorama color image (PCI), while the view angle positions P and P' of the depth camera 210 and the color camera 220 are changed as the prism lens 233 of the view angle extender 230 is rotated by the motor 237 of the rotary section 236.

In more detail, as shown in FIG. 6, when the view angle positions of the depth camera 210 and the color camera 220 are changed from P to P', for example, rotated by 270° as the prism lens 233 of the direction changer 231 is rotated by the motor 237 of the rotary section 236, the depth camera 210 and the color camera 220 typically photograph thirty sheets of depth image frames and color image frames per second.

Figure 8:
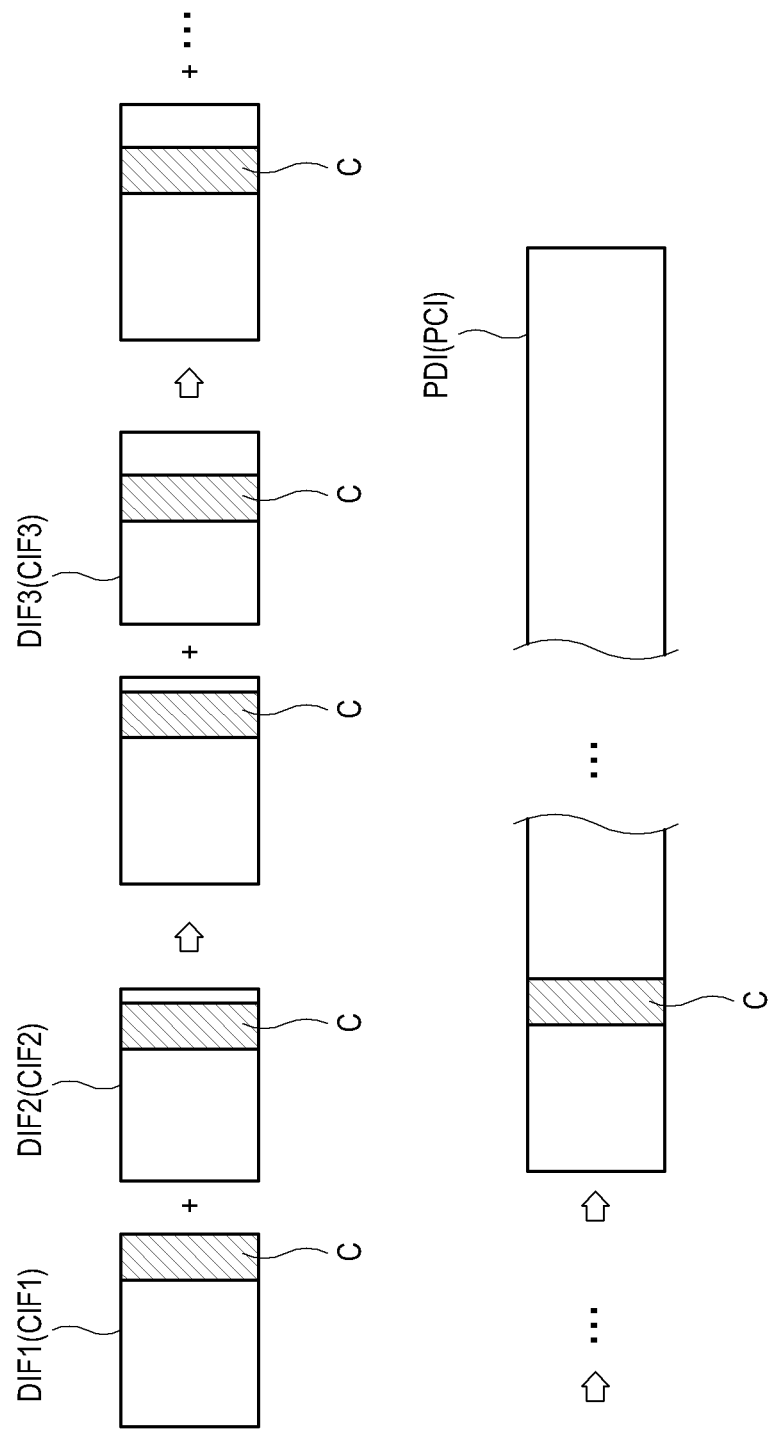
FIG. 8 is a view for explaining a process where adjacent depth image frames photographed by the depth camera and adjacent color image frames photographed by the color camera are respectively synthesized in sequence to form a panorama depth image and a panorama color image.

Therefore, as shown in FIG. 8, to make the panorama depth image (PDI) and the panorama color image (PCI) after the view angle positions of the depth camera 210 and the color camera 220 are rotated from P to P' by 270°, the first controller 250 respectively synthesizes the photographed adjacent depth image frames DIF1, DIF2, DIF3, ... and the photographed adjacent color image frames CIF1, CIF2, CIF3, ... in sequence.

At this time, the panorama depth image (PDI) and the panorama color image (PCI) are formed by finding a coincident characteristic point C and thus sequentially matching the adjacent depth image frames DIF1, DIF2, DIF3, ... and the adjacent color image frames CIF1, CIF2, CIF3, ... through a characteristic point matching algorithm.

Also, to easily form a 3D image in a synthesizer 320 of the display device 300 (to be described later), the first controller 250 may adjust the panorama depth image (PDI) photographed by the depth camera 210 and the panorama color image (PCI) photographed by the color camera 220 to have the same resolution.

At this time, the resolution of the depth image frames DIF1, DIF2, DIF3, ... is generally lower than the resolution of the color image frames CIF1, CIF2, CIF3, ... , and therefore the adjustment may be performed with respect to the depth image frame.

Figure 9:
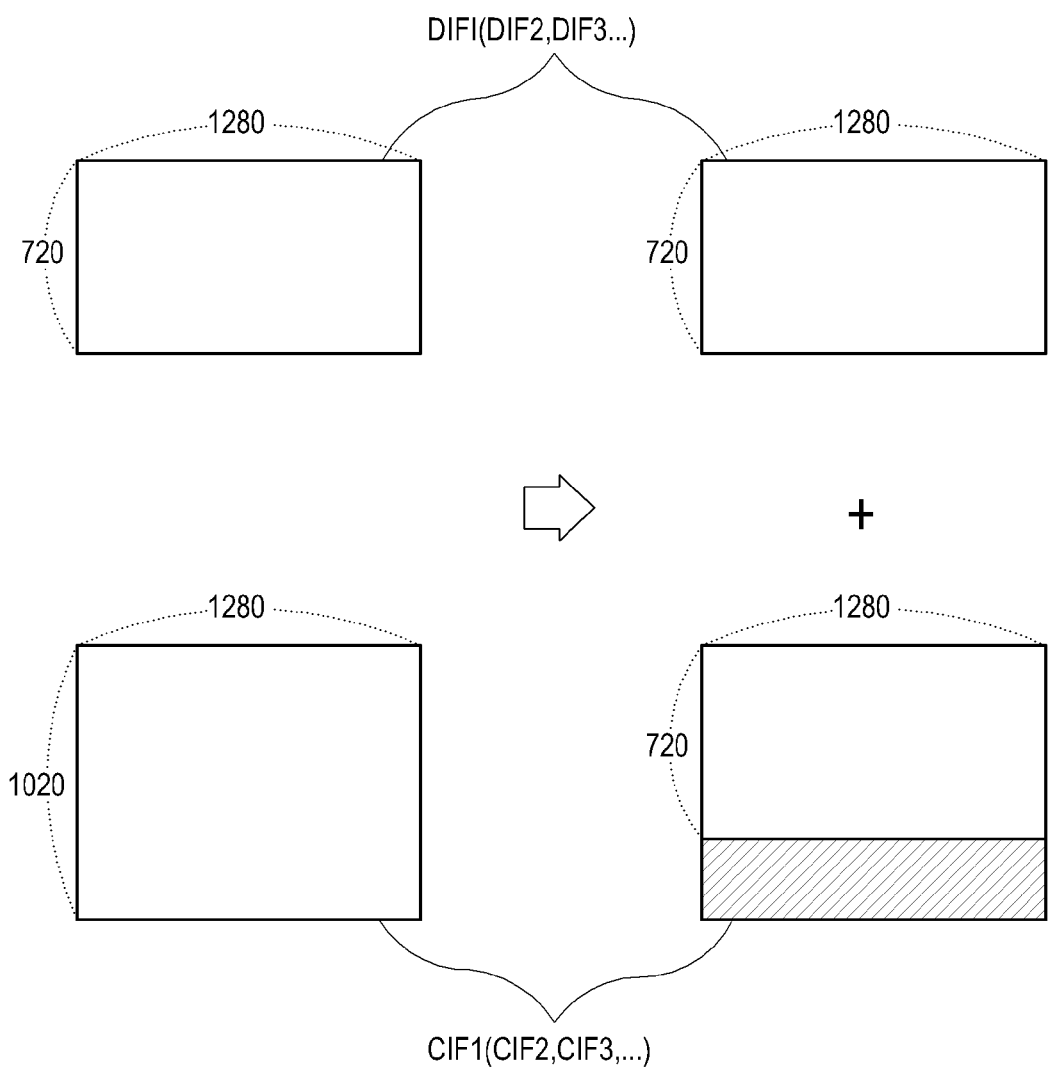
FIG. 9 is a view showing an example that the color image frames are sequentially synthesized with respect to resolutions of the depth image frames so as to form the panorama color image.

For example, the first controller 250 may adjust the color image frames CIF1, CIF2, CIF3, ... and the depth image frames DIF1, DIF2, DIF3, ... to have the same resolution while the color image frames CIF1, CIF2, CIF3, ... and the adjacent depth image frames DIF1, DIF2, DIF3, ... are synthesized respectively. That is, as shown in FIG. 9, if the adjacent depth image frames DIF1, DIF2, DIF3, ... have a resolution of 1280×720 pixels and the adjacent color image frames CIF1, CIF2, CIF3, ... have a resolution of 1280× 1020 pixels, the first controller 250 sequentially synthesizes the adjacent color image frames CIF1, CIF2, CIF3, ... to only 1280×720 pixels (i.e., excluding the hatching part), equal to the resolution of the adjacent depth image frames DIF1, DIF2, DIF3, ... , thereby forming the panorama color image (PCI).

Figure 10:
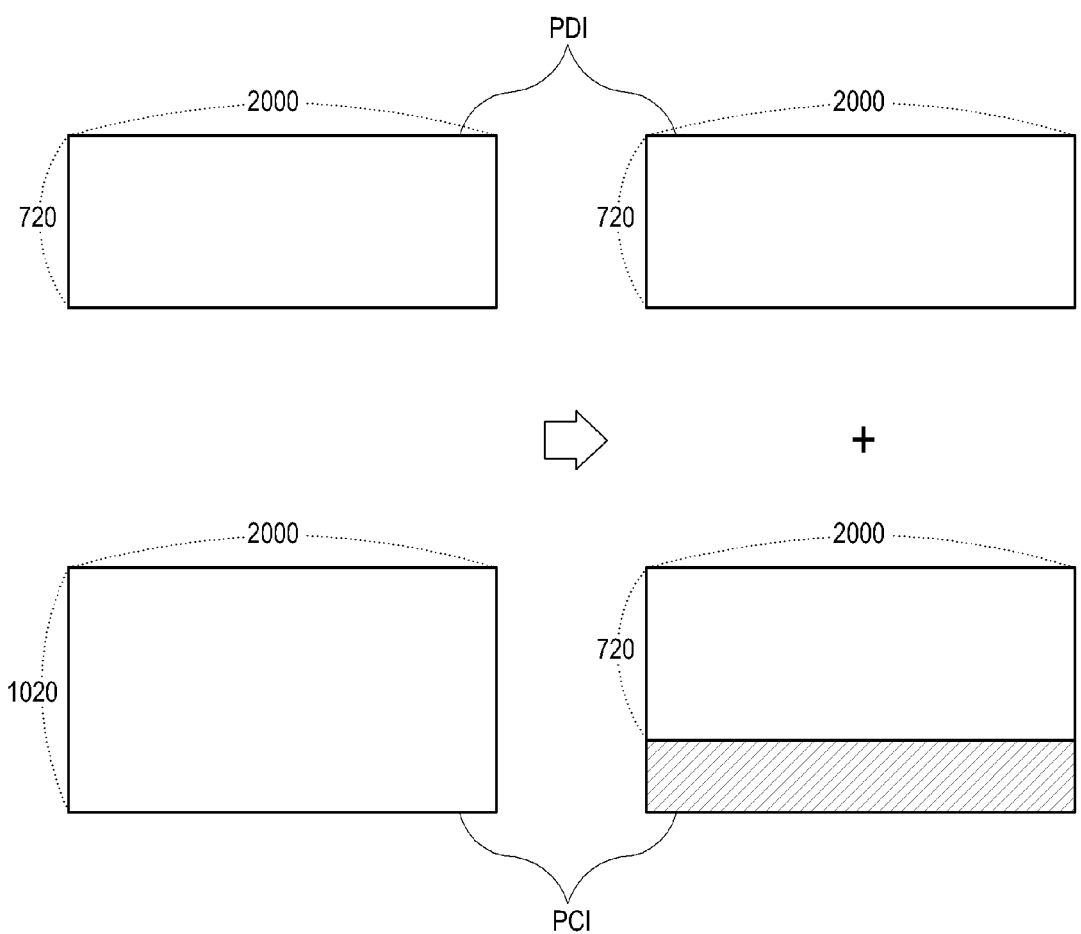
FIG. 10 is a view showing an example that a panorama color image is adjusted in resolution with respect to a resolution of a panorama depth image.

Or, for example, after forming the panorama color image (PCI) and the panorama depth image (PDI) by respectively synthesizing the adjacent color image frames CIF1, CIF2, CIF3, ... and the adjacent depth image frames DIF1, DIF2, DIF3, ... , the first controller 250 may adjust the panorama color image (PCI) to have the same resolution as the panorama depth image (PDI). That is, as shown in FIG. 10, if the panorama depth image (PDI) has a resolution of 2000×720 pixels and the panorama color image (PCI) has a resolution of 2000×1020 pixels, the first controller 250 may output the panorama color image (PCI) with 2000×720 pixels (i.e., except the hatching part), equal to the resolution of the panorama depth image (PDI) to the display device 300, together with the panorama depth image (PDI).

Selectively, instead of operating the first controller 250 in order to adjust the panorama depth image (PDI) and the panorama color image (PCI) to have the same resolution, the panorama color image (PCI) may be synthesized with the panorama depth image (PDI) to form a 3D panorama image with respect to only the resolution equal to the resolution of the panorama depth image (PDI) when the synthesizer 320 of the display device 300 synthesizes the panorama color image (PCI) and the panorama depth image (PDI).

Also, the first controller 250 compensates distortion of the depth image due to distortion caused by distance from a subject—such distortion may be caused by the incline of the reflection plane 234 of the prism lens 233 when the depth camera 210 photographs the depth image.

Figure 11:
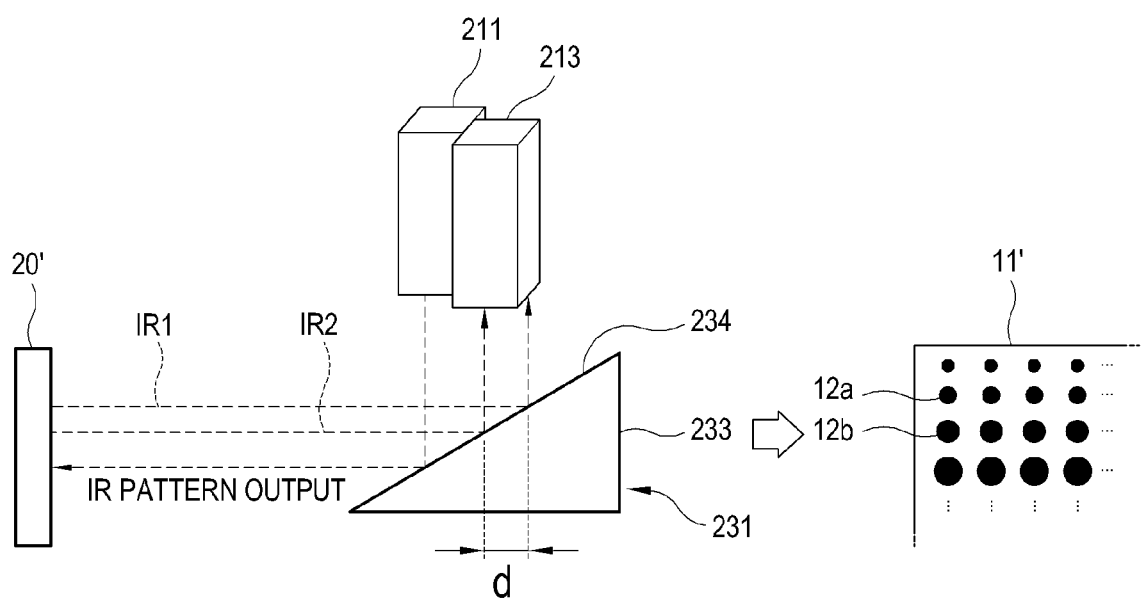
FIG. 11 is a view for explaining distortion of distance from a subject, in which respective IR points of an IR pattern of a depth image signal about the subject are represented by pixels having different sizes because a reflection plane of a prism lens is inclined even though the subject is a plane placed at the same distance.

In more detail, as shown in FIG. 11, even though the subject 20' is a plane positioned at the same distance, the depth image signal converted from the IR rays IR1 and IR2 at respective IR points on the IR pattern 11' for the subject 20' reflects the distortion of the distance from the subject 20', which is displayed as different pixel values 12a and 12b due to distance differences d from the subject 20' caused by the incline of the reflection plane 234 of the prism lens 233.

Therefore, the first controller 250 uses a linear curve fitting algorithm to compensate for the distortion of the distance from the subject 20' in consideration of the size of the IR pattern output from the IR pattern generator 211 and the incline of the reflection plane 234 of the prism lens 233. That is, differences in distance from the subject 20' with respect to the reference IR ray at the respective IR points of the IR pattern 11' are calculated, and a pixel value related to the calculated distance difference is subtracted from the pixel value (12a, 12b) of the respective IR rays IR1 and IR2, thereby compensating for the distance distortion about the subject 20'.

Figure 12:
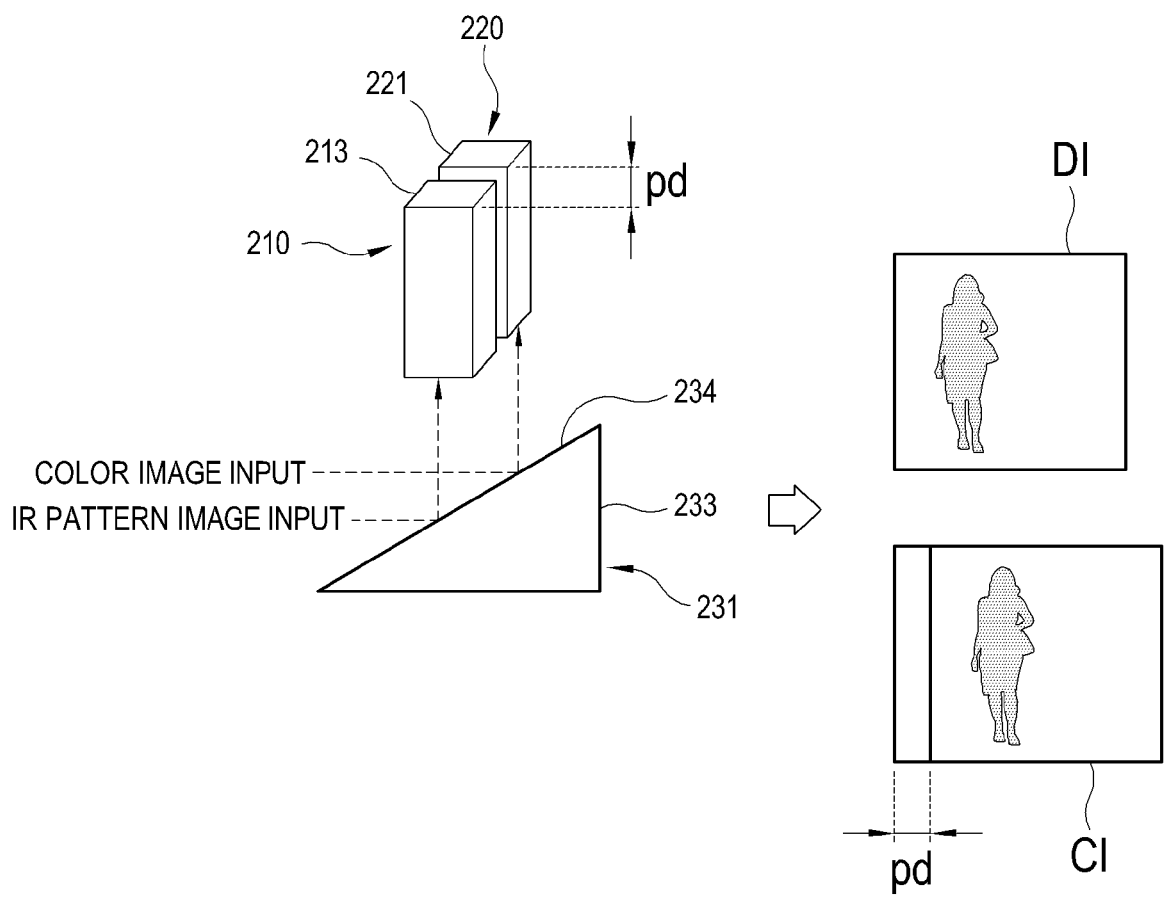
FIG. 12 is a view for explaining deviation in a pixel position between a depth image photographed by the depth camera and a color image photographed by the color camera, which is caused by difference in position between the depth camera and the color camera.

Also, as shown in FIG. 12, position difference pd between the first image sensor 213 of the depth camera 210 and the second image sensor 221 of the color camera 220 causes a depth image DI photographed by the depth camera 210 and a color image CI photographed by the color camera 220 to be different in a pixel position from each other inasmuch as the position difference pd.

Thus, the first controller 250 compensates for deviation in pixel position between the depth image DI photographed by the depth camera 210 and the color image CI photographed by the color camera 220 by factoring in the position difference pd between the first image sensor 213 and the second image sensor 221.

At this time, the deviation in the pixel position between the depth image DI and the color image CI may be compensated by finding and matching the same characteristic point through the publicly known characteristic point matching algorithm, or may be compensated by calculating a translation matrix through the publicly known translation matrix operation algorithm based on output image position matrixes of the depth image DI and the color image CI and then cropping image data of the depth image DI or the color image CI based on the calculated translation matrix.

The foregoing first controller 250 may be achieved by a central processing unit (CPU) and a random access memory (RAM) for executing the foregoing control program stored in the first storage 240.

Selectively, the first controller 250 may be achieved by an application-specific integrated circuit (ASIC) chip designed to have the foregoing control program.

Although the image generating device 200 has been illustrated and explained as including the depth camera 210 and the color camera 220, so that the depth images and the color images photographed while the view angle thereof is changed and extended are synthesized to form the single depth image and the single color image, respectively, exemplary embodiments are not limited thereto. For example, instead of the depth camera 210 and the color camera 220, the image generating device 200 may be configured to include cameras capable of photographing images having different image properties such as different resolutions, so that different property images photographed while the view angle thereof is extended are synthesized to form corresponding single property images, respectively.

Figure 17:
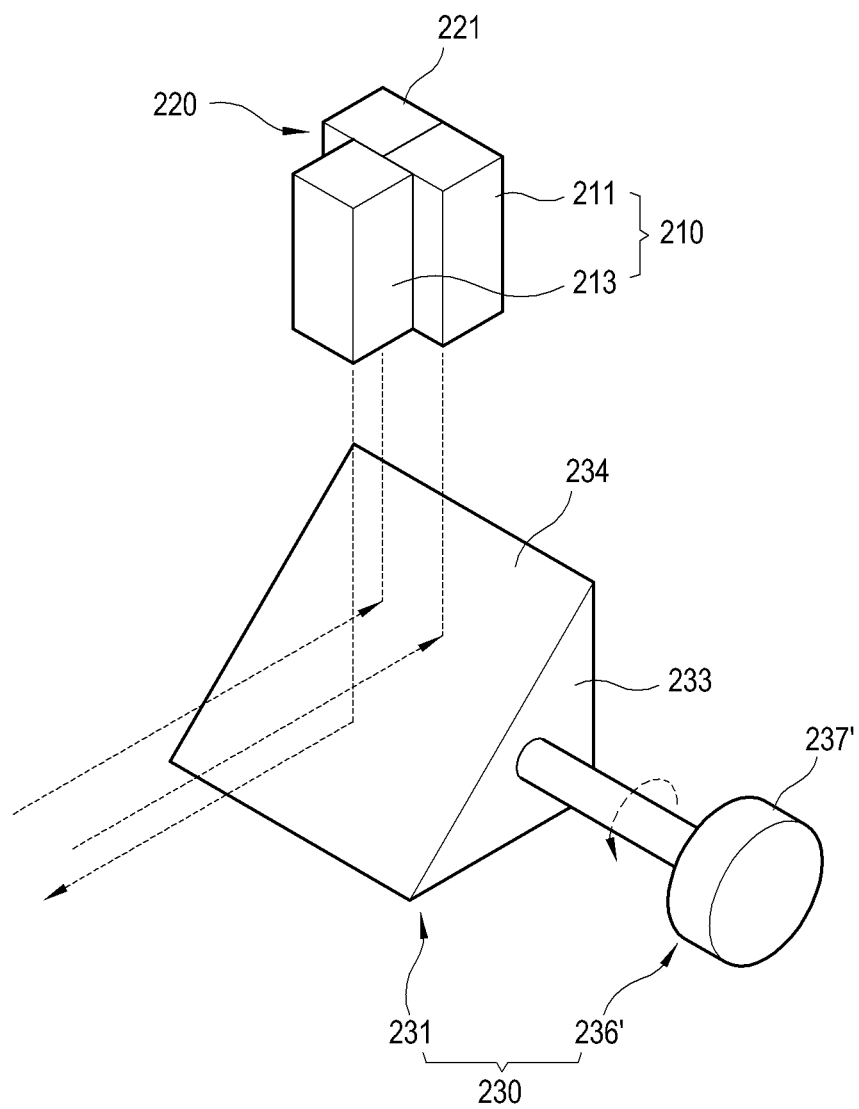
FIG. 17 is a perspective view showing another example of an image generating device of the 3D image display system shown in FIG. 3.

Further, although the image generating device 200 has been illustrated and explained as being configured so that in order to extend the view angle of the depth camera 210 and the color camera 220 in a left and right direction, the rotation section 236 of the view angle extender 230 includes the motor 237 connected to the lower side of the prism lens 233 and the encoder 239 built in or on the motor 237, exemplary embodiments are not limited thereto. For example, as shown in FIG. 17, the rotation section 236' may be configured so that it can extend the view angle of the depth camera 210 and the color camera 220 in an up and down direction. For this, the rotation section 236' may include a motor 237' connected to a right side of the prism lens 233 and an encoder (not shown) built in or on the motor 237' (instead of the motor 237 and the encoder 239 shown in earlier drawings), and, in this case, a plurality of depth image frames and a plurality of color image frames photographed by the depth camera 210 and the color camera 220 while the view angle thereof is changed in the up and down direction by the rotation section 236' can be formed and synthesized to form a corresponding single depth image and a corresponding single color image, respectively, in the same principle as the method implemented using the rotation section 236 as described above.

Figure 18:
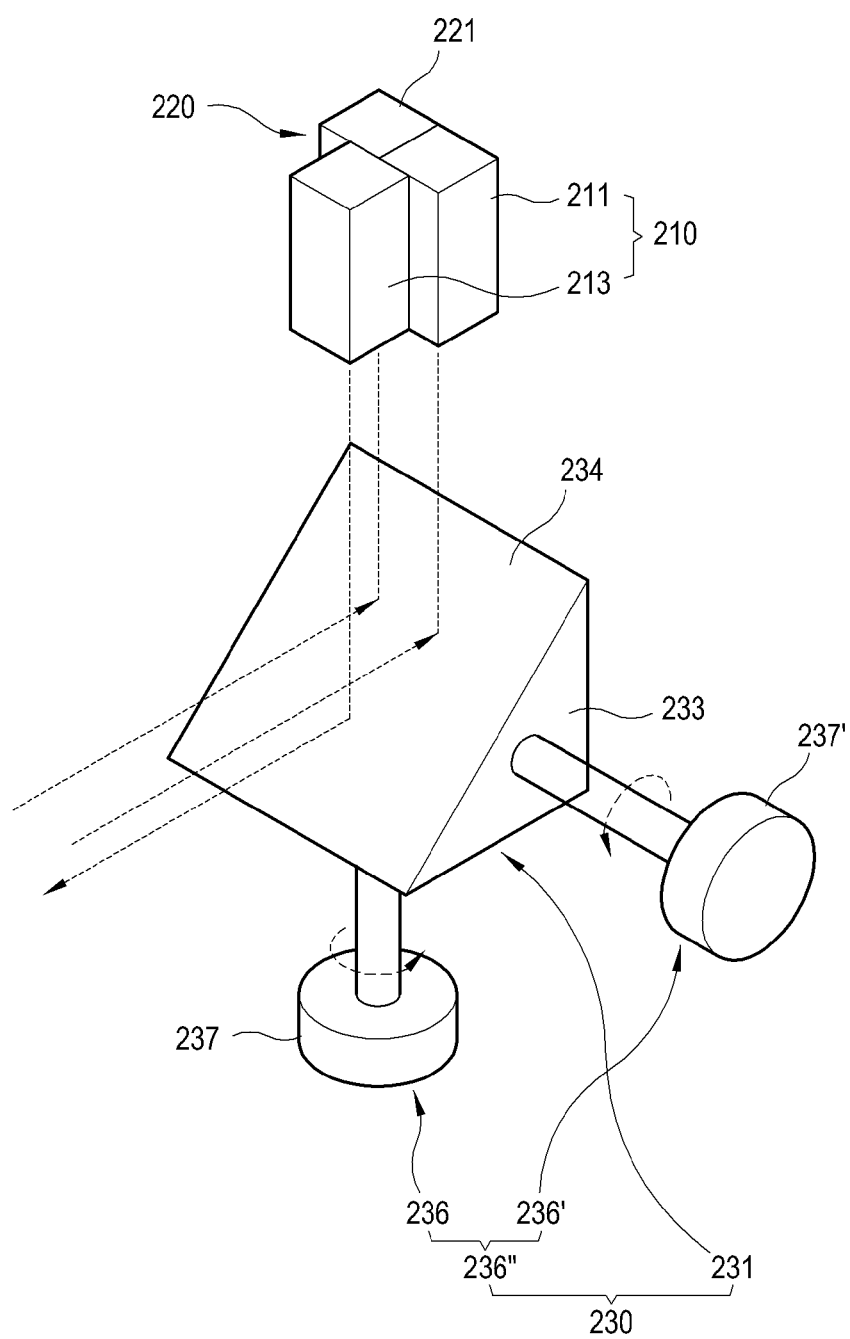
FIG. 18 is a perspective view showing other example of an image generating device of the 3D image display system shown in FIG. 3.

Also, as shown in FIG. 18, the rotation section 236" may be configured, so that it can extend the view angle of the depth camera 210 and the color camera 220 in both the left and right direction and the up and down direction. For this, the rotation section 236" may include a first rotation section 236 having a first motor 237 and a first encoder (not shown), a second rotation section 236' having a second motor 237' and a second encoder (not shown), and a guide section (not shown) to guide and support the first rotation section 236 and the second rotation section 236' in rotation thereof. The guide section may be configured so that when one of the first rotation section 236 and the second rotation section 236' is rotated by the other, it can guide the rotation of the one and support the other. In this case, a single depth image and a single color image in one of the left and right direction and the up and down direction are formed separate from and sequent to a single depth image and a single color image in the other of the left and right direction and the up and down direction. And then, they are synthesized to form a final single depth image and a final single color image in the left and right direction and the up and down direction.

Figure 13:
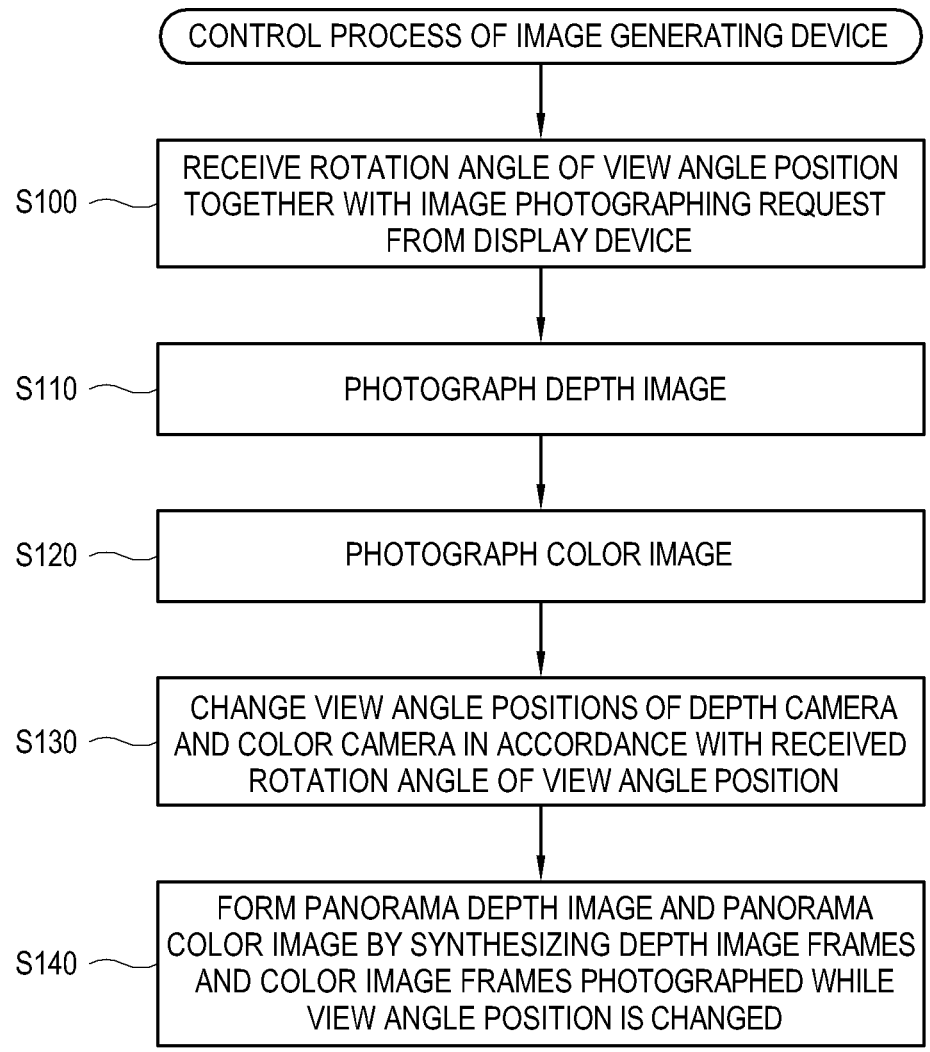
FIG. 13 is a flowchart showing an example of a control process for the image generating device according to an exemplary embodiment.

Below, control processes of the image generating device 200 with the foregoing configuration will be described with reference to FIG. 13.

First, if receiving an image photographing request and the rotation angle of the view angle positions P and P' set up by a user from the second controller 310 of the display device 300 (S100), the first controller 250 photographs the depth image of the subject through the depth camera 210 (S110).

Also, the first controller 250 converts light received from the outside through the color camera 220 into an image signal, thereby photographing the color image (S120).

Also, the first controller 250 changes the view angle positions of the depth camera 210 and the color camera 220 from P to P' in accordance with the rotation angle, e.g., 270° of the view angle positions P and P' received from the second controller 310 (S130).

At this time, the first controller 250 controls the motor 237 to rotate the prism lens 233 by 270°.

The first controller 250 sequentially synthesizes the depth image frames and the color image frames photographed while the view angle positions P and P' are changed, as described with reference to FIG. 8, and forms the single depth image and the single color image, the view angles of which are extended by 270°, i.e., the panorama depth image (PDI) and the panorama color image (PCI) (S140).

At this time, as described with reference to FIGS. 9 and 10, the first controller 250 adjusts the panorama depth image (PDI) photographed by the depth camera 210 and the panorama color image (PCI) photographed by the color camera 220 to have the same resolution. At this time, the resolution may be adjusted with respect to the depth image.

Also, as described with reference to FIG. 11, the first controller 250 compensates for the photographed depth image by factoring in the incline of the reflection plane 234 of the prism lens 233.

Also, as described with reference to FIG. 12, the first controller 250 compensates for deviation in the pixel position between the depth image DI photographed by the depth camera 210 and the color image CI photographed by the color camera 220 based on the position difference pd between the first image sensor 213 and the second image sensor 221.

Referring back to FIG. 3, the display device 300 forms a 3D panorama image by synthesizing the panorama color image (PCI) and the panorama depth image (PDI) photographed by the image generating device 200, and displays the formed 3D panorama image. The display device may include a television (TV) with a built-in program engine, a general TV, a personal computer (PC) or the like capable of displaying an image.

Below, the TV having the built-in program engine will be described as the display device 300 by way of example.

The display device 300 includes a user input 350, a second storage 340, a second controller 310, and a display 360.

The user input 350 receives a user's input. The user input 310 for example includes a remote controller (not shown), and a remote control signal receiver (not shown) for receiving a remote control signal from the remote controller. The remote control signal may include key input information corresponding to a user's input.

Also, the user input 350 may include an input key for selectively turning on/off the display device 300.

The user's input received through the user input 350 is transmitted to the second controller 310, and the second controller 310 controls corresponding elements in response to the user's input.

The second storage 340 stores a control program for controlling general functions of the display device 300, a photographing control program for controlling image photographing of the image generating device 200, an image synthesizing program for synthesizing the panorama color image (PCI) and the panorama depth image (PDI) to form a 3D image, and an application execution program for recognizing a motion of a body or the like based on the panorama color image (PCI) and the panorama depth image (PDI) and executing an application needed in accordance with the recognized motion, etc.

Also, the second storage 340 stores the 3D panorama image formed when the synthesizer 320 synthesizes the panorama color image (PCI) and the panorama depth image (PDI) to form the 3D panorama image.

The second storage 340 may be achieved by a nonvolatile memory such as a flash memory, a hard disk, etc. similar to the first storage 240.

The second controller 310 controls general operations of the display device 300, which may be achieved by a CPU and a RAM for executing the control program or the like stored in the second storage 340.

Also, the second controller 310 executes a photographing control program stored in the second storage 340 in accordance with a user's selection via the user input 350. If a user selects a 3D image photographing setup screen on an initial screen of the photographing control program executed by the second controller 310 and selects an operation mode, for example, a photographing mode or application executing mode, and a desired rotation angle of the view angle positions P and P' to be respectively executed through the mode selection tap and the rotation angle selection tap, the second controller 310 transmits the rotation angle, e.g., 270° of the view angle positions P and P' set up by a user while requesting for the image photographing to the first controller 250 of the image generating device 200. In response to the request for the image photographing from the second controller 310, the first controller 250 controls the depth camera 210, the color camera 220 and the rotary section 236 to form the panorama depth image (PDI) and the panorama color image (PCI), the view angle of which is extended up to 270°, as described above with reference to FIG. 13 and transmits them to the second controller 310.

Also, the second controller 310 includes the synthesizer 320 and the program engine 330.

The synthesizer 320 forms a 3D panorama image or a 3D application panorama image by synthesizing the panorama color image (PCI) and the panorama depth image (PDI) received from the first controller 250, and outputs it to the display 360.

In more detail, if a user selects the photographing mode, the synthesizer 320 synthesizes only the received panorama color image (PCI) and panorama depth image (PDI) to form a 3D panorama image and outputs it to the display 360.

If a user selects the application executing mode, the synthesizer 320 synthesizes the received panorama color image (PCI) and panorama depth image (PDI) with graphic data and/or text data for executing an application output from the program engine 330 and thus forms and outputs a 3D application panorama image to the display 360.

The synthesizer 320 may be achieved by an image synthesizing program stored in the second storage 340.

The program engine 330 includes a program generating block 331, and an image processing block 333.

The program generating block 331 receives the panorama color image (PCI) and the panorama depth image (PDI) received from the first controller 250 in the application executing mode, analyzes the received panorama color image (PCI) and panorama depth image (PDI) to recognize the motion of the body or the like, and generates graphic data and/or text data for executing a 3D game, an augmented reality application or the like in accordance with the recognized motions to thereby output the graphic data and/or text data to the image processing block 333.

The image processing block 333 performs image processing to the generated graphic data and/or text data and outputs it to the synthesizer 320. The image processing block 333 may have functions for decoding, image enhancement, scaling, etc.

The program engine 330 may be achieved by the application executing program stored in the second storage 340.

The display 360 receives and displays a 3D panorama image or a 3D application panorama image output from the synthesizer 320.

The display 360 may be achieved in the form of a flat panel display such as a liquid crystal display (LCD), an organic light emitting diode (OLED), or an active matrix organic light emitting diode (AMOLED), etc. for displaying a 3D image and/or 3D panorama image.

In the foregoing, the display device 300 is the TV with the built-in program engine, but is not limited thereto. Alternatively, the display device 300 may be a general TV or PC.

Figure 14:
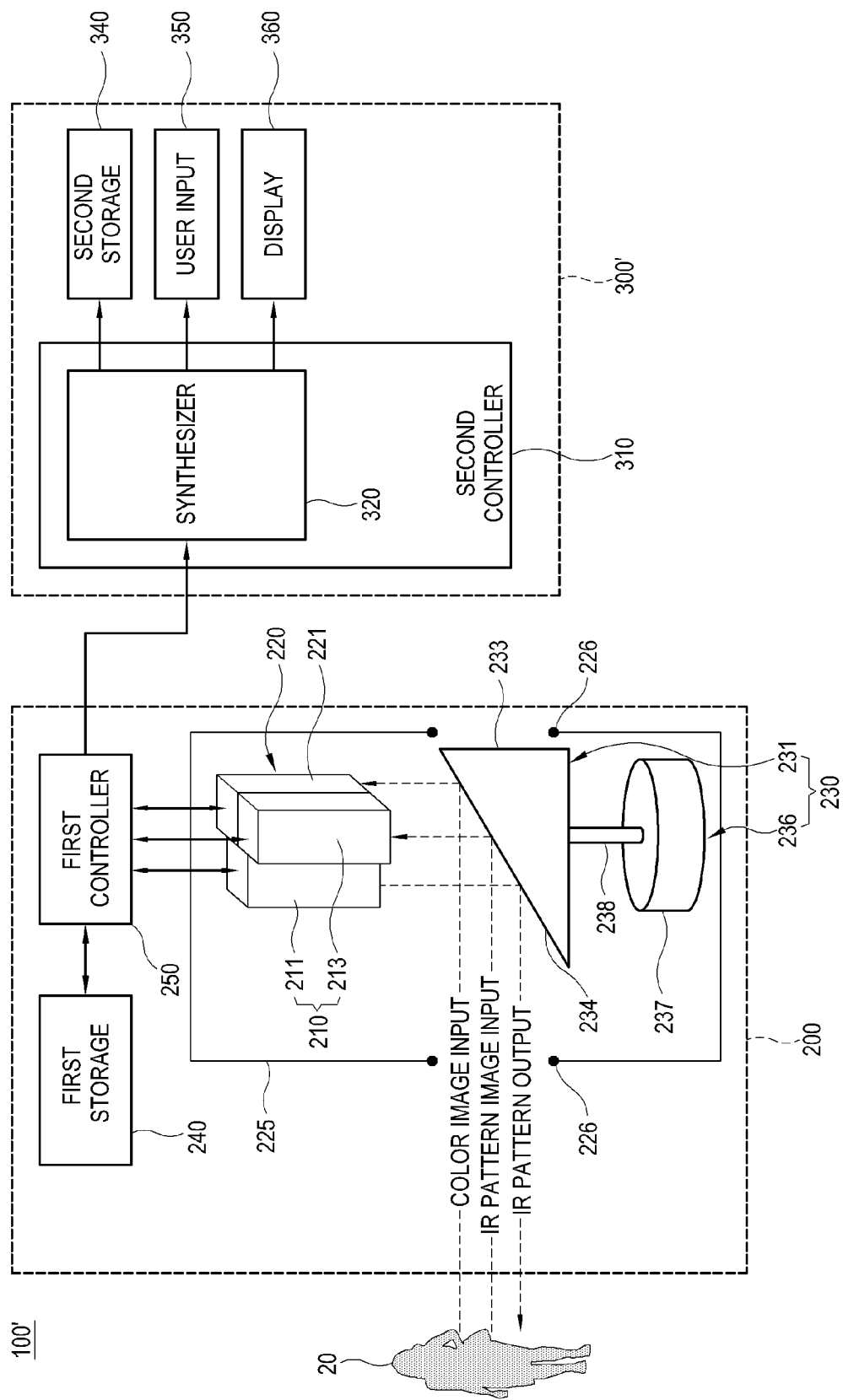
FIGS. 14 and 15 are block diagrams of 3D display systems having image generating devices, according to different exemplary embodiments.

For example, as shown in FIG. 14, if the display device is achieved by a general TV, the display device 300' of the display system 100' is the same as the TV with the built-in program engine as shown in FIG. 3 except that the program engine 330 is removed.

Figure 15:
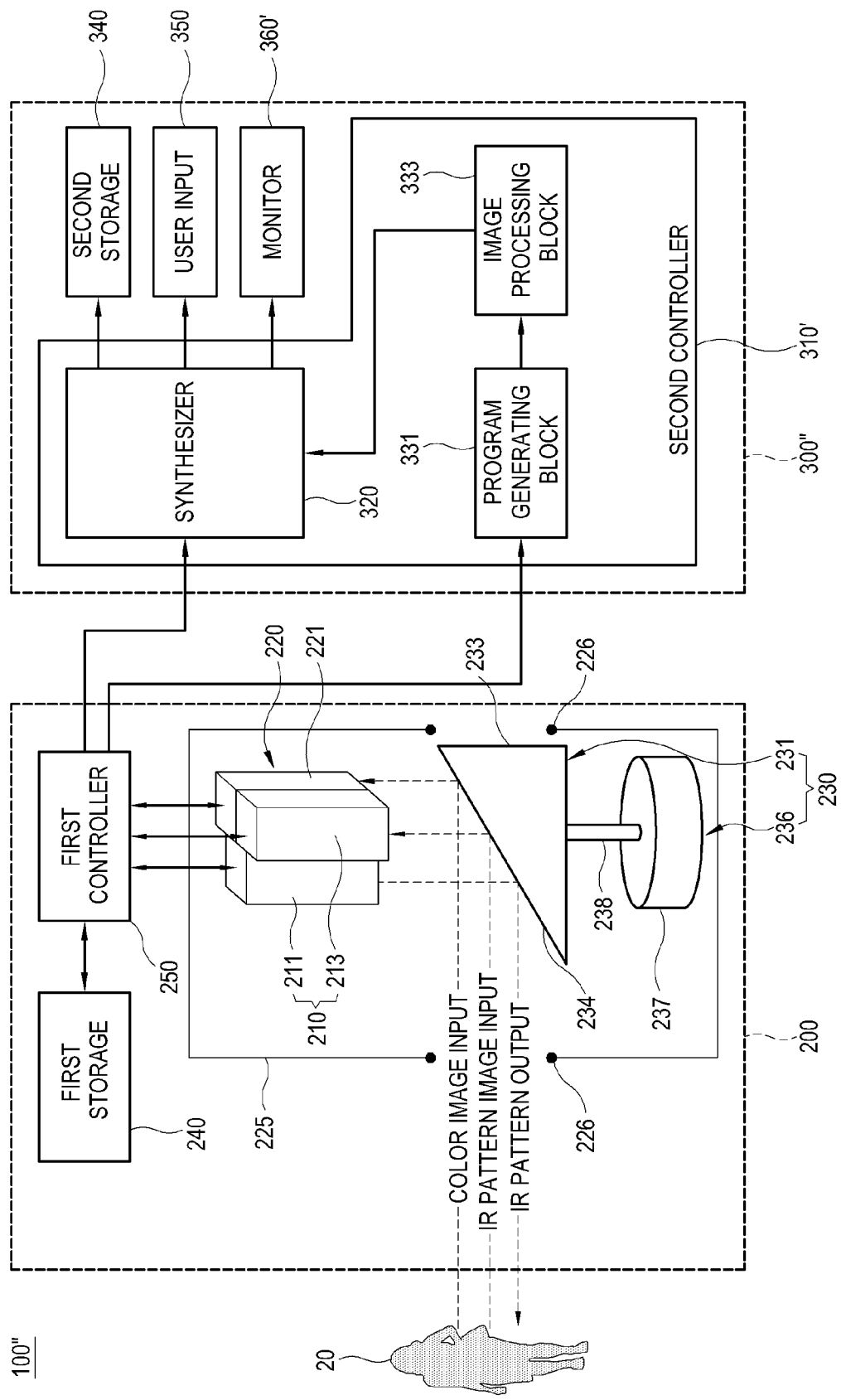

Also, as shown in FIG. 15, if the display device is achieved by a PC, the display device 300" of the display system 100" is the same as the TV with the built-in program engine as shown in FIG. 3 except that the display 360 is replaced by a monitor 360' capable of displaying a 3D image and/or a 3D panorama image and a second controller 310' is achieved by a CPU and a RAM of a PC main body.

Below, control processes of the 3D image display system 100 with the foregoing configuration will be described with reference to FIG. 16.

First, after the 3D image display system 100 is turned on, a user selects the 3D image photographing setup screen on the initial screen displayed by executing the photographing control program via the user input 350. Then, if a user selects an operation mode, for example, a photographing mode or application executing mode and a desired rotation angle of the view angle positions P and P' (that is, the rotation angle of the rotary section 236), for example, 270°, to be respectively executed through the mode selection tap and the rotation angle selection tap and presses an execution button, the second controller 310 transmits the rotation angle of the view angle positions P and P' set up by a user while requesting for the image photographing to the first controller 250 of the image generating device 200 (S200).

If receiving the image photographing request and the rotation angle of the view angle positions P and P' set up by a user from the second controller 310, the first controller 250 forms the panorama depth image (PDI) and the panorama color image (PCI), the view angle of which is extended to 270° through the depth camera 210 and the color camera 220 while controlling the rotary section 236 in accordance with the rotation angle of the view angle positions P and P' set up by a user, and transmits the formed images to the second controller 310 (S210).

After receiving the panorama color image (PCI) and the panorama depth image (PDI) from the first controller 250, the second controller 310 determines whether the current operation mode selected by a user in the step of S200 is the photographing mode (S220).

If it is determined that the current operation mode is the photographing mode, the second controller 310 controls the synthesizer 320 to synthesize the received panorama depth image (PDI) and panorama color image (PCI) and form a 3D panorama image, thereby outputting the formed 3D panorama image to the display 360 (S230).

If it is determined in the step S220 that the current operation mode is not the photographing mode, the second controller 310 determines whether the operation mode selected by a user is the application executing mode (S240).

If it is determined that the operation mode is the application executing mode, the second controller 310 controls the program engine 330 to analyze the received panorama color image (PCI) and panorama depth image (PDI), recognize the motion of the body or the like, generate the graphic data and/or text data for executing a needed application in accordance with the recognized motion, apply image processing to the generate data, and output the processed data to the synthesizer 320 (S245).

The synthesizer 320 synthesizes the panorama color image (PCI) and the panorama depth image (PDI) received from the first controller 250 with the graphic data and/or text data output from the program engine 330 and used for executing the application, thereby forming the 3D application panorama image and outputting it to the display 360 (S250).

The display 360 receives the 3D panorama image or the 3D application panorama image from the synthesizer 320, and displays it (S260).

As described above, there are provided the image generating device 200, the 3D image display system 100 having the same, and the control methods thereof, in which the view angle extender 230 changes the view angle positions P and P' of the depth camera 210 and the color camera 220 to have a specific angle β, and the first controller 250 synthesizes the image frames of the photographed depth image and color image and converts the single depth image and the single color image of which the view angles are extended while the view angle positions P and P' are changed by the view angle extender 230 into the specific angle β. Also, the changeable angle of the view angle positions P and P' may be set up by a user within a range from 0° to 270° (for example, from 142° to 270°). Therefore, the image generating device 200 according to an exemplary embodiment and the 3D image display system 100 having the same can photograph a 3D image having various view angles and resolutions, such as a 3D panorama image.

Although a few exemplary embodiments have been shown and described, it will be appreciated by those skilled in the art that changes may be made in these exemplary embodiments without departing from the principles and spirit of the invention. Therefore, the foregoing has to be considered as illustrative only. The scope of the invention is defined in the appended claims and their equivalents. Accordingly, all suitable modification and equivalents may fall within the scope of the invention.

What is claimed is:

1. An image generating device comprising:
a first camera configured to photograph a depth image of a subject using a first light;
a second camera configured to photograph a color image of the subject by converting a second light into an image signal;
a view angle extender placed in an optical path of the first camera, the second camera and the subject and comprising a prism lens having a reflection plane for reflecting the first light and the second light and changing a traveling direction thereof, which is rotatably disposed therein, to change a view angle, the view angle being an angle at which the first camera and the second camera are operable to photograph the subject; and
a processor, executing stored programming instructions, configured:
to control the view angle extender to rotate the reflection plane to change a view angle of the first camera and the second camera upon a condition that the subject is photographed by the first camera and the second camera, and
to form a single depth image and a single color image by respectively synthesizing a plurality of depth images and a plurality of color images, photographed by the first camera and the second camera.

2. The image generating device according to claim 1, wherein the first camera comprises:
a pattern generator configured to generate the first light in a pattern; and
an image sensor configured to convert the first light having the pattern reflected from the subject into a depth image signal.

3. The image generating device according to claim 2, wherein the depth image signal comprises information about distance from the subject.

4. The image generating device according to claim 2, wherein the view angle extender comprises:
a direction changer configured to be placed in the optical path of the first camera, the second camera and the subject, wherein the direction changer comprises the reflection plane having an incline for changing a direction of the first light and the second light; and
a rotary section configured to rotate the direction changer.

5. The image generating device according to claim 4, wherein the direction changer comprises the prism lens having the reflection plane.

6. The image generating device according to claim 4, wherein the rotary section comprises:
a motor comprising a driving shaft connected to the direction changer; and
an encoder provided in the driving shaft of the motor, wherein the encoder senses rotation of the driving shaft.

7. The image generating device according to claim 1, wherein the view angle is set up by a user to be changed within a range from 0° to 270°.

8. The image generating device according to claim 4, wherein the processor compensates for distortion of the distance from the subject by calculating a difference in the distance from the subject with respect to a reference ray of the first light at each point of the rays of the first light of the pattern reflected from the subject and subtracting a pixel value related to the calculated distance difference from a pixel value related to each ray of the first light.

9. The image generating device according to claim 8, wherein the processor compensates for deviation in a pixel position between the depth image and the color image caused by position difference between the first camera and the second camera based at least on the position difference between the first camera and the second camera.

10. The image generating device according to claim 9, wherein the deviation is compensated for by matching a same characteristic point, or calculating a translation matrix using output image position matrixes related to the plurality of depth images and the plurality of color images and then cropping image data about the plurality of depth images or the plurality of color images based on the calculated translation matrix.

11. The image generating device according to claim 1, wherein the processor adjusts the plurality of depth images and the plurality of color images or the single depth image and the single color image to have the same resolution.

12. The image generating device according to claim 11, wherein the resolution is adjusted with respect to the depth image.

13. A method of controlling an image generating device, the method comprising:
photographing a depth image of a subject using a first light;
photographing a color image of a subject by converting a second light into an image signal;
rotating a prism lens having a reflection plane for reflecting the first light and the second light and changing a traveling direction thereof, to change a view angle, wherein the view angle is an angle at which the depth image and the color image are photographed; and respectively synthesizing a plurality of depth images and a plurality of color images to form a single depth image and a single color image.

14. The method according to claim 13, wherein the rotating the reflection plane comprises transmitting the first light to the subject in a pattern, and rotating the reflection plane having an incline to an angle for changing a direction of the first light so that the first light reflected from the subject travels toward a first camera and for changing a direction of the second light toward a second camera.

15. The method according to claim 14, wherein the rotating the reflection plane comprises compensating for distortion of a distance from the subject by calculating the difference in the distance from the subject with respect to a reference ray of the first light at each point of the rays of the first light of the pattern reflected from the subject and subtracting a pixel value related to the calculated distance difference from a pixel value related to each ray of the first light.

16. The method according to claim 15, wherein the rotating the reflection plane comprises compensating for deviation in a pixel position between the depth image and the color image by considering a position difference between the first camera and the second camera.

17. The method according to claim 16, wherein the rotating the reflection plane comprises adjusting the plurality of depth images and the plurality of color images or the single depth image and the single color image to have a same resolution.

18. A display system comprising:
an image generating device comprising a first camera configured to photograph a depth image of a subject using a first light, a second camera configured to photograph a color image of the subject by converting a second light into an image signal, a view angle extender placed in an optical path of the first camera, the second camera and the subject and comprising a prism lens having a reflection plane for reflecting the first light and the second light and changing a traveling direction thereof, which is rotatably disposed therein, to change a view angle, wherein the view angle is an angle at which the first camera and the second camera are operable to photograph the subject, and a first processor, executing stored programming instructions, configured to control the view angle extender to rotate the reflecting plane to change the view angle of the first camera and the second camera when the subject is photographed by the view angle extender and to form a single depth image and a single color image by respectively synthesizing a plurality of depth images and a plurality of color images, photographed by the first camera and the second camera;
a second processor executing stored programming instructions and comprising a synthesizer configured to synthesize the single depth image and the single color image generated by the image generating device and form a 3D image; and
a display configured to display the 3D image formed by the synthesizer.

19. The display system according to claim 18, wherein the second processor further comprises a program engine configured to generate and output at least one from among graphic data and text data required for executing an application based on at least one from among the single depth image and the single color image generated by the image generating device.

20. The display system according to claim 19, wherein the program engine is configured:
to recognize a user's motion based on at least one from among the single depth image and the single color image generated by the image generating device and generate at least one from among the graphic data and the text data required for executing the application in accordance with the recognized motion; and
to perform image processing with regard to at least one from among the generated graphic data and text data and output the processed data to the synthesizer.

21. The display system according to claim 18, wherein the display system comprises one from among a 3D television (TV) system, a 3D personal computer (PC) system and augmented reality glasses.

22. A method of controlling a display system with an image generating device comprising a first camera for photographing a depth image using a first light and a second camera for photographing a color image using a second light, the method comprising:
rotating a prism lens having a reflection plane for reflecting the first light and the second light and changing a traveling direction thereof to set a view angle at which the first camera and the second camera are operable to photograph;
photographing a plurality of depth images and a plurality of color images;
synthesizing the plurality of depth images and the plurality of color images to form a single depth image and a single color image, respectively;
synthesizing the single depth image and the single color image to form a 3D image; and
displaying the formed 3D image.

23. The method according to claim 22, further comprising determining whether an operation mode is a photographing mode or an application executing mode.

24. The method according to claim 23, wherein upon a condition that it is determined that the operation mode is the photographing mode, the forming the 3D image comprises synthesizing only the single depth image and the single color image to form the 3D image.

25. The method according to claim 23, wherein upon a condition that it is determined that the operation mode is the application executing mode, the forming the 3D image comprises:
generating at least one from among graphic data and text data required for executing an application based on at least one from among the single depth image and the single color image;
performing image processing to at least one from among the generated graphic data and text data; and
synthesizing at least one from among the processed graphic data and the processed text data with the single depth image and the single color image to form a 3D application image.

26. The image generating device according to claim 1, wherein the plurality of depth images and the plurality of color images are photographed while the view angle is changed by the view angle extender.

27. The image generating device according to claim 8, wherein the distortion of the distance from the subject occurs based on the incline of the reflection plane.

28. The method according to claim 13, wherein the plurality of depth images and the plurality of color images are photographed while the view angle is changed.

29. The method according to claim 15, wherein the distortion of the distance from the subject occurs based on the incline of the reflection plane.

30. The display system according to claim 18, wherein the plurality of depth images and the plurality of color images are photographed while the view angle is changed by the view angle extender.

31. The method according to claim 22, wherein the plurality of depth images and the plurality of color images are photographed while the view angle is changed.

* * * * *